United States Patent [19]
Hoegberg et al.

[11] 3,905,902
[45] Sept. 16, 1975

[54] RECOVERY OF OIL AND OIL-SOLUBLE CONTAMINANTS FROM THE SURFACE OF WATER

[76] Inventors: Ruth G. Hoegberg, 209 Matroy Ln., Wallingford, Pa. 19086; Walter S. Tyler, Valley View, R.D. No. 1, Landisburg, Pa. 17040

[22] Filed: Sept. 10, 1973

[21] Appl. No.: 395,683

Related U.S. Application Data

[63] Continuation-in-part of Ser. No. 180,729, Sept. 15, 1971, abandoned.

[52] U.S. Cl. .................... 210/30; 210/40; 210/242; 210/DIG. 21
[51] Int. Cl.² ........................................ B01D 15/00
[58] Field of Search .......... 55/103; 210/40, 59, 242, 210/30, DIG. 21; 252/312, 316

[56] References Cited
UNITED STATES PATENTS

| | | |
|---|---|---|
| 3,146,192 | 8/1964 | McClintock .......................... 210/40 |
| 3,201,620 | 8/1965 | Ballentine ......................... 55/103 X |
| 3,358,838 | 12/1967 | Kosar et al. .................. 210/DIG. 21 |
| 3,635,819 | 1/1972 | Kaiser ..................................... 210/40 |

OTHER PUBLICATIONS

"Recovery of Floating Oil Rotating Disk Type Skimmer," EPA, Water Quality Office, July 1971.

*Primary Examiner*—Samih N. Zaharna
*Assistant Examiner*—Robert H. Spitzer
*Attorney, Agent, or Firm*—Dressler, Goldsmith, Clement & Gordon, Ltd.

[57] ABSTRACT

Water pickup is minimized in the recovery of oil from water, including sea water, by negatively electrostatically charging hydrophobic rotating discs which are immersed in the water. Oil can be applied to the discs to help maintain the charge in the oil phase. The application of oil to the discs can also be used to remove thin films of oily material which contain oil-soluble contaminants from the surface of a body of water.

10 Claims, 3 Drawing Figures

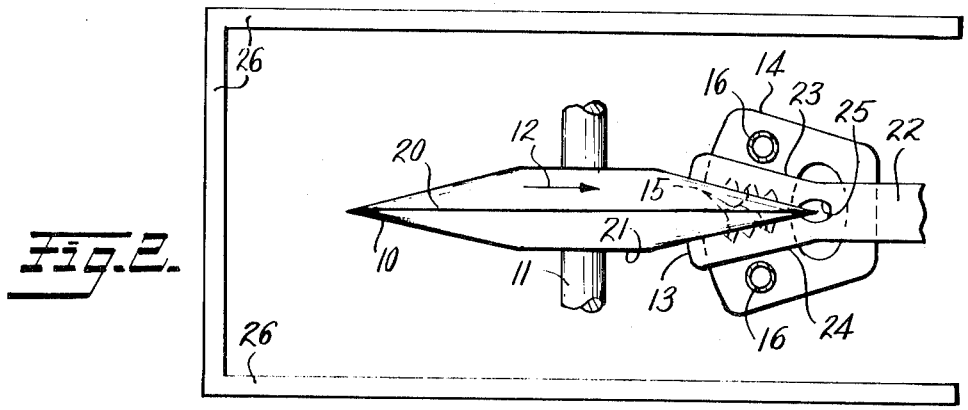
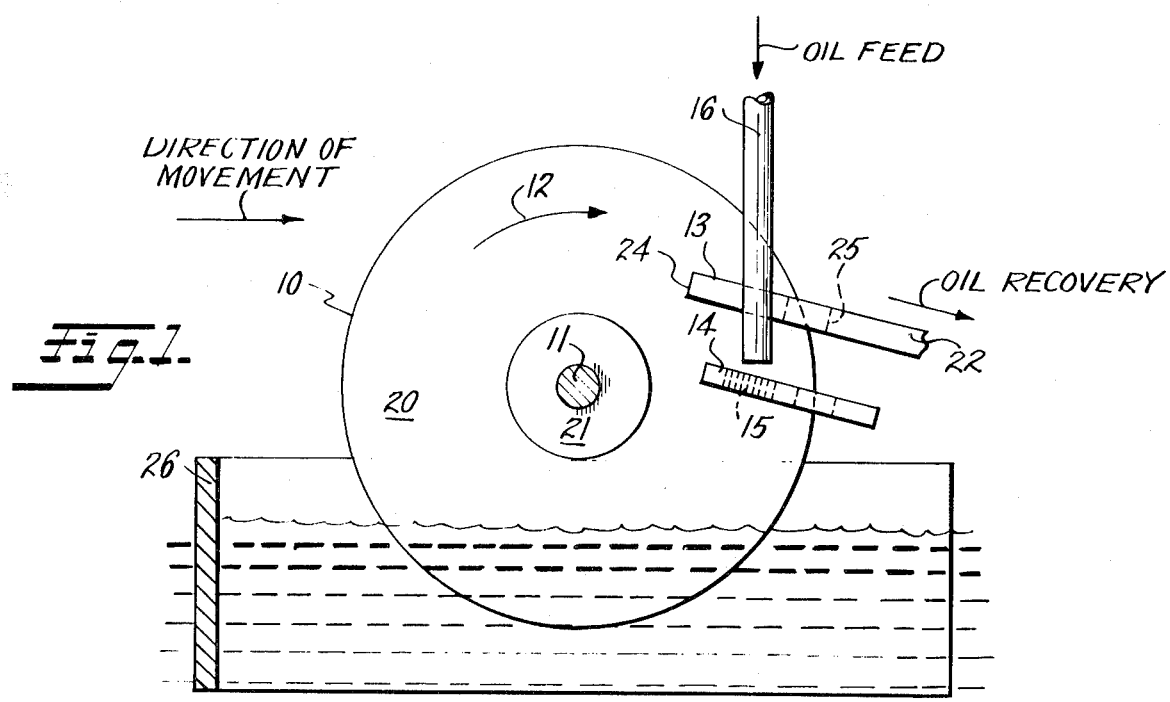
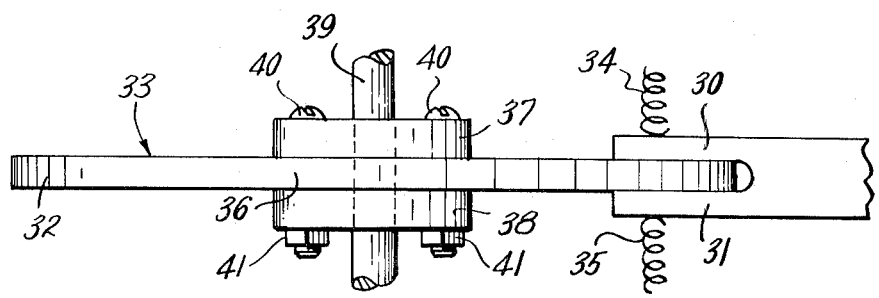
INVENTORS
RUTH G. HOEGBERG
WALTER S. TYLER

RECOVERY OF OIL AND OIL-SOLUBLE CONTAMINANTS FROM THE SURFACE OF WATER

The present application is a continuation-in-part of our prior application Ser. No. 180,729, filed Sept. 15, 1971, and abandoned subsequent to the filing of this application.

The present invention relates to methods and apparatus for the recovery of oil or oil-soluble contaminants from water, which may be fresh water, an aqueous chemical solution or sea water, while minimizing the pickup of water. As a feature of the invention, oil-soluble materials present at the surface of water or dispersed in the water near the surface are picked up and removed. The removal of oil or oil-soluble contaminants minimizes pollution, and any oil which is recovered is valuable in its own right. Another feature of the invention is the recovery of oil, and especially crude oil, from sea water.

It has been found that the imposition of a negative electrostatic charge upon a rotating disc made of hydrophobic dielectric polymer partially immersed in water will cause the disc to more selectively pick up oil floating on or near the surface of the water, thus minimizing the simultaneous pickup of water. For this invention minimizing the pickup of water is not dependent upon the increased pickup of oil but upon the presence of the negative electrostatic charge on the disc. It has also been found that by coating the rim of the disc with a small amount of oil after the picked up oil has been removed, but before the rim is reimmersed in the water, the amount of water pickup is greatly lowered even when no oil is present on the water surface. Moreover, oil-soluble substances floating near the surface of oil-free water will be picked up by the oil applied to the disc.

The methods and apparatus of this invention may be used directly on an open body of water or within a chamber in which event it is preferred to form or coat the interior walls with a dielectric polymer.

The disc, in this invention, may be made of any hydrophobic dielectric polymer, non-polar dielectric polymers being more hydrophobic than polar dielectric polymers. Polypropylene or polyethylene can be used to good effect, but the preferred material is polytetrafluoroethylene which is available in commerce under the trade name "Teflon". Polyvinylidene fluoride, tradename "Kynar", while somewhat polar in nature, is strongly hydrophobic and can be used.

The dielectric discs may have positioned between them non-grounded conducting discs, especially when used in a chamber lined with dielectric material, since this serves to increase the electrostatic charge which is developed and maintained on the dielectric discs. These conducting discs will pick up water in preference to oil, and are not wiped since this would defeat the invention.

It is possible to apply the negative electrostatic charge to the dielectric disc using an external source of electricity, but it is preferred to apply the charge by using a wiper made of a material which, when the disc is rubbed against it, imparts a negative charge to the disc. This wiper, at the same time, removes substantially all of the oil that has been picked up in the area which is wiped. Neoprene has been found to be particularly suitable, but triboelectricity is a well known phenomenon and a triboelectric table will suggest other suitable materials to those skilled in the art.

The existence of a negative electrostatic charge on the rotating disc directly affects the amount of water which is picked up. The amount of water picked up can thus be decreased by establishing a significant negative charge on the disc which is done either by increasing the pressure of the wiper against the disc or by increasing the speed of the disc, the amount of water being picked up decreasing to trace amounts as soon as the charge is established at a level where it is easily detected.

The polarity of the electrostatic charge applied to the disc must be negative, since a positive charge defeats the invention by increasing the pickup of water. In practice, a plurality of closely spaced discs are used, and all must be correspondingly charged to avoid having any relatively uncharged discs become positively charged by induction. The positively induced charge creates a water pump which is obviously undesirable.

Oil applied to the disc after it has been wiped helps to prevent the charge from being transferred through the water, thus maintaining the charge on the disc and oil surface. It has been found that when the electrostatic charge does not remain in the oil phase, but is instead conducted through the water phase, an increase in water pickup is experienced. This is of particular importance when the oil to be recovered is present in a very thin film, or is scattered in separated patches on the surface of the water. In such circumstance, the application of a dielectric oil film to the wiped disc will help to maintain the negative electrostatic charge on the disc. The application of oil to the rotating disc is particularly important to the pickup of spilled oil on sea water which is highly conductive, and on aqueous solutions of strong electrolytes such as sodium hydroxide, and most especially to the pickup of crude oil. The use of the invention with a sodium hydroxide solution has particular application in the removal of oil from tar sand and from pulverized oil-bearing shale.

The use of an oil film applied to the wiped disc also increases the pickup of oil-soluble substances which tend to concentrate at the surface of a body of water. Many harmful contaminants, such as DDT and related compounds, polychlorinated biphenyl compounds, and other oil-soluble substances including organo-metallic compounds and other toxic oil-soluble chemicals are not appreciably water soluble, and instead, tend to accumulate at the surface of quiescent bodies of water such as lakes, slowly moving rivers, and coastal areas. It should be kept in mind that considerable biological activity takes place at the air-water interface so that the removal of contaminants from this region is especially significant. These hydrophobic oil-soluble compounds are picked up by the oil-coated disc and can be removed from the water in this fashion.

The applied oil will be a dielectric oil of low viscosity to enable its application to the disc in the form of a thin film and to insure electrical continuity between the disc surface and the oil in the water. When the oil being recovered is an oxidized oil with poor dielectric properties, the added oil serves importantly to maintain the charge on the disc.

If the oil on the disc is not wiped off with a pressure applicator, then no triboelectric charge is generated and water is picked up. Then, the water wet disc will repel thin patches of oil as they approach the disc. Performance will become increasingly poor as the water wet disc becomes starved for oil.

It is stressed that the establishment of a charge is defeated by the electrically proximate presence of any grounded conductor in contact with the oil-water surface and extending through it into the body of water. Thus, if the disc and wiper are properly selected with enough pressure to create the desired charge, this charge can bleed off through the water, and turn the disc into a water pump.

It is sometimes helpful to apply an agent to the oil surface in the vicinity of the discs to aid in the even distribution of the oil on the surface of the water. Camphor dissolved in a lightweight (free flowing) oil is especially useful, causing the oil, and especially crude oil, to immediately spread out evenly on the water. This is particularly helpful where the oil is thickly agglomerated or scattered in separate patches. The camphor helps to reduce emulsification of the oil with the water, and since this also helps to keep the discs evenly coated with oil, it also helps to minimize water pickup.

The invention will be more fully understood from the accompanying drawings which diagrammatically picture an apparatus constructed in accordance with the teachings of this invention.

FIG. 1 is a partial side elevation showing the partially immersed disc with associated structure;

FIG. 2 is a plan view of the structure shown in FIG. 1; and

FIG. 3 is a plan view of a modified structure.

Referring more particularly to the structure shown in the drawings, 10 identifies a disc of hydrophobic dielectric polymer which is fastened to and rotated by a shaft 11. It will be understood that while only a single disc is pictured, in practice there will be many parallel discs spaced apart along the length of the shaft. Multiple shafts may also be used with the discs staggered in arrangement if desired.

The disc 10 in FIG. 1 is shown partially submerged in water which may be fresh water or salt water. It will be understood that oil may be present floating on the upper surface of the water, but the oil is not shown since the invention is intended to function regardless of whether oil is present or absent since, in either event, water pickup is to be minimized. The disc 10 is rotated in the direction shown by arrow 12. The speed of rotation is not a prime factor in the invention and will be selected depending upon operational convenience, so long as the desired electrostatic charge is obtained. Since the speed of movement of the disc surface against the wiper is important, the diameter of the disc and the bearing pressure of the wiper against the disc have to be taken into consideration.

Rotational speeds of from about 3 up to about 200 revolutions per minute are appropriate, but more generally the speed will vary from 5–150 revolutions per minute, more preferably from 10–100 revolutions per minute. With the disc 10 rotating as shown, any oil picked up from the water will first come in contact with the wiper 13. It will be seen that the disc 10 is formed to include a rim portion 20 as well as a central portion 21. The central portion 21 is keyed to the shaft 11 in any conventional manner, and the rim portion 20 picks up oil and is pressed against by the wiper 13.

It is desired to stress that it is not essential for the wiper 13 to bear physically against the rim 20 in order to remove oil which may be picked up and convey the same away to storage. However, and in this invention, the wiper 13 is pressed against the rim 20 with considerable force so as to frictionally bear against the same and produce a static charge by triboelectric effect. To do this and produce a negative electrostatic charge as is important to the invention, the disc 10 may be typically polypropylene, polyethylene, or Teflon, and the wiper would be constituted by Neoprene.

The wiper structure can be more clearly seen in FIG. 2 where it will be observed that the wiper 13 includes an arm 22 which is bifurcated at its forward end to form bearing elements 23 and 24. The point at which the bifurcated elements come together may be made of or reinforced with Teflon or other dielectric material. Also, the point at which the bifurcated elements come together may be depressed as shown at 25 to enable a pool of oil to collect through which the edge or rim of the disc continuously rotates while the wiper 13 is pressed directly against the disc 10 to create the frictional pressure which is desired. The wiper designed with the depressed area 25 may serve as an additional or alternate method for keeping the edge or rim of the disc wet with oil during rotation.

Accordingly, with disc rotation in the direction shown, the surface of the disc beneath the wiper 13 is wiped substantially free of oil and it may be desired to reapply a film of oil to the rim 20 before the rim 20 reenters the water. For this purpose, an oil applicator 14 is employed, the inner surfaces of which bear against the rim portion 20 beneath the oil wiper 13. It has been found that a serrated surface identified by the numeral 15 is convenient and oil is supplied through a conduit 16 to drip onto the oil applicator 14 and to be applied in a thin film on the disc 10 and a film of oil is optionally, though preferably applied to the charged surface and this helps to retain the negative electrostatic charge in the oil phase.

A nongrounded baffle 26 partially immersed in the water near the disc 10 may also be used. The baffle 26 may be made of or coated with a dielectric material. The baffle serves to help maintain the electrostatic charge on the disc and in the oil phase. This is especially helpful when the aqueous phase is a strong electrolyte such as sea water and when crude oil is present in a spotty film. The baffle 26 is preferably positioned at the rear of a disc and surrounds it at the sides as shown in FIGS. 1 and 2 to concentrate the oil near the disc and trap it until it is taken up. This is especially helpful in removing surface contaminants which dissolve in the trapped oil. The baffle may be used when operating the apparatus on an open body of water or when operating within a chamber.

It will be noted that the rotation of the disc 10 is such that the immersed portion of the disc moves from the open end of the baffle 26 toward the closed end of the baffle so that the surface liquid is drawn into the baffle.

With the baffle positioned as shown, it is possible to feed oil containing camphor to the surface of the liquid within the baffle, the movement of the disc and the positioning of the baffle maintaining the added oil within the baffle.

FIG. 3 shows a modified structure in which the discs are flat to make it clear that the designation rim portion and central portion do not require that these portions be differently shaped. In this modification, the wiper elements 30 and 31 are biased against the rim 32 of the disc 33 by means of springs 34 and 35. The central portion 36 of the disc 33 is supported by the collars 37 and 38 in shaft 39, the collars being secured by bolts 40 and nuts 41.

It is desired to point out further that the application of an oil film to the discs is helpful. This is because the applied oil, which may be constituted by any light oil including harmless evaporative petroleum oils, including kerosene to which from 0.01–2% by weight of camphor may be added to assist even spreading of the film, and biodegradable, non-toxic, polyunsaturated edible oils, is helpful to pick up insecticides and other oil-soluble materials which concentrate in naturally occurring slicks, and it is desirable to remove such contaminants even though the slicks containing the same may be monomolecular and present in separated patches. The added oil assists the static charge in developing an affinity for the lipid material of the slick, and the negative static charge also creates an affinity for the metal cations contained in the slick. Indeed, in certain natural slick areas, it has been found that the concentration of mercury in the form of organic mercury derivatives is 8–10 times higher than is the mercury content of the surrounding water. In some of the oil slicks which we have picked up, the concentration of metals is unexpectedly high. For chlorinated pesticides, concentration factors which are even higher have been reported in naturally occurring sea slicks on biologically reproductive waters. Where large tonnages of oil are to be picked up at sea, it is not desirable to burden the oil recovery vessel with the simultaneous acquisition of large amounts of water. The oil film added to the discs as needed retains the negative electrostatic charge on the discs and minimizes such water pickup.

It will be understood that the generation of the desired electrostatic charge by triboelectric effect is particularly preferred in this invention because the structure is simple and easily operated and the charge is generated directly where it is needed. It is also desirable to be able to completely remove the oil film on the rim of the disc where contaminants are being removed from the surface of water instead of large volumes of oil. On the other hand, it is possible to generate the negative electrostatic charge in known manner and simply direct the charge to the desired point on the disc.

The level of charge does not appear to be restrictive so long as the existence of a negative electrostatic charge can be detected.

It is conventional to detect the charge by means of a gold leaf electroscope which is positioned closely proximate to the disc but not in the vicinity of the wiper (about one-fourth inch away from the rim of the disc). If the gold leaves separate by as much as 30° in an electroscope whose gold leaves are three-fourths inch long, this is indicative of a significant electrostatic charge in accordance with this invention. Preferably, the gold leaves are separated by at least 45°.

This invention is particularly illustrated using Teflon discs shaped as shown in FIG. 3 and having a diameter of 6 inches rotated at a speed of 48 revolutions per minute. The discs are immersed in water to a depth of 1½ inches. Neoprene wipers are used to remove the picked-up oil. Wiper pressure provides a negative electrostatic charge which is sufficient to produce a 45° spread between the leaves of a gold leaf electroscope. The structure is effective to remove oil, both refined and crude, as well as vegetable and animal oils, both from fresh water and sea water. As soon as the static charge is noted, water pickup drops off, in some instances to a mere trace. Oil is desirably added to maintain the minimization of water pickup when the discs are rotated in oil-free water, in very thin films of oil, patchy films of oil, or weathered oil especially when the water phase is a strong conductor as is sea water. Also, application of oil serves to pick up organic mercury compounds, other organo-metallic compounds, polychlorinated biphenyl compounds, and other toxic, oil-soluble chemicals and insecticides concentrated at the surface of fresh or sea water.

The discs are preferably closely spaced, e.g., less than about 2 inches apart at the point of contact with the water. This is to ease the burden of maintaining a continuous dielectric film between the discs which causes the charge to build up as operation proceeds. AS a result, performance is less satisfactory at the start of operation, and improves with time as the charge level increases.

It is stressed that material selection for the oil pickup discs has previously been carefully investigated by others, and metals were found by them to be superior to dielectric plastics. It is remarkable to observe that the superimposition of electrostatic concepts as in this invention completely reverses the known characteristics.

The invention is defined in the claims which follow.

We claim:

1. A method of recovering oil or oil-soluble contaminants from the surface of water while minimizing the simultaneous pickup of water consisting of partially immersing in the water a plurality of discs of hydrophobic dielectric polymer which are electrostatically isolated from grounded conductors in contact with the water, rotating said discs so that the rim portion of the discs is moved through the water to pick up oil or oil-soluble contaminants floating thereon, and frictionally wiping said discs to remove all of the picked up material therefrom in the area of contact, the frictional wiping contact and the speed of rotation of said discs triboelectrically establishing and said electrostatic isolation maintaining a negative electrostatic charge on each of said discs.

2. A method as recited in claim 1 in which oil is applied as a film to the rim of said discs after picked-up oil has been removed from said rim and before said rim is reimmersed in water.

3. A method as recited in claim 2 in which the added oil is an oil of low dielectric constant.

4. A method as recited in claim 2 in which the added oil includes .01-2% camphor to assist easy spreading of the film.

5. A method as recited in claim 1 in which said hydrophobic dielectric polymer is nonpolar.

6. A method as recited in claim 1 in which said oil is removed from the rim portion of said discs by a wiper which is made of Neoprene.

7. A method as recited in claim 1 in which camphor is dissolved in light oil and added to the crude oil on the surface of a body of sea water in the vicinity of the discs.

8. A method as recited in claim 1 in which the negative electrostatic charge is sufficient to produce a separation of the gold leaves of an electroscope positioned one-fourth inch away from the rim of the discs by at least 30°, said gold leaves being three-fourths inch long.

9. Apparatus for recovering oil or oil-soluble contaminants from the surface of water consisting of a plurality of discs of hydrophobic dielectric polymer which are electrically isolated from grounded conductors in contact with the water, means to partially immerse said discs in a body of water, means to rotate said discs to move the rim portion of the discs through the water, a wiper frictionally engaging the rim of each of the discs to remove all of the oil or oil-soluble contaminants carried thereon in the area of contact therebetween, said wipers being made of a material which, when they rub against said rims, will impose a negative electrostatic charge on each of said discs, the frictional wiping contact between the wipers and the discs and the speed of rotation of the discs being adapted to triboelectrically establish a negative electrostatic charge on each of said discs which is maintained by said electrical isolation, and means to apply oil to the rim of the discs, said oil-applying means being positioned between said wiper and the point where said rim is reimmersed in said water.

10. Apparatus for recovering oil or oil-soluble contaminants from the surface of water consisting of a plurality of discs of hydrophobic dielectric polymer which are electrically isolated from grounded conductors in contact with the water, means to partially immerse said discs in a body of water, means to rotate said discs to move the rim portion of the discs through the water, a wiper frictionally engaging the rim of each of the discs to remove all of the oil or oil-soluble contaminants carried thereon in the area of contact therebetween, the frictional wiping contact between the wiper and the discs and the speed of rotation of said discs triboelectrically establishing a negative electrostatic charge on said discs which is maintained by said electrical isolation, a partially immersed baffle closed at one end and open at the other to surround said discs at the rear and at the sides thereof, said baffle being constructed and arranged so that it will not discharge electricity, and said discs being mounted to rotate so that the portion of the discs which is immersed in the water will move from the open end of the baffle toward the closed end thereof.

* * * * *